Figure 1:
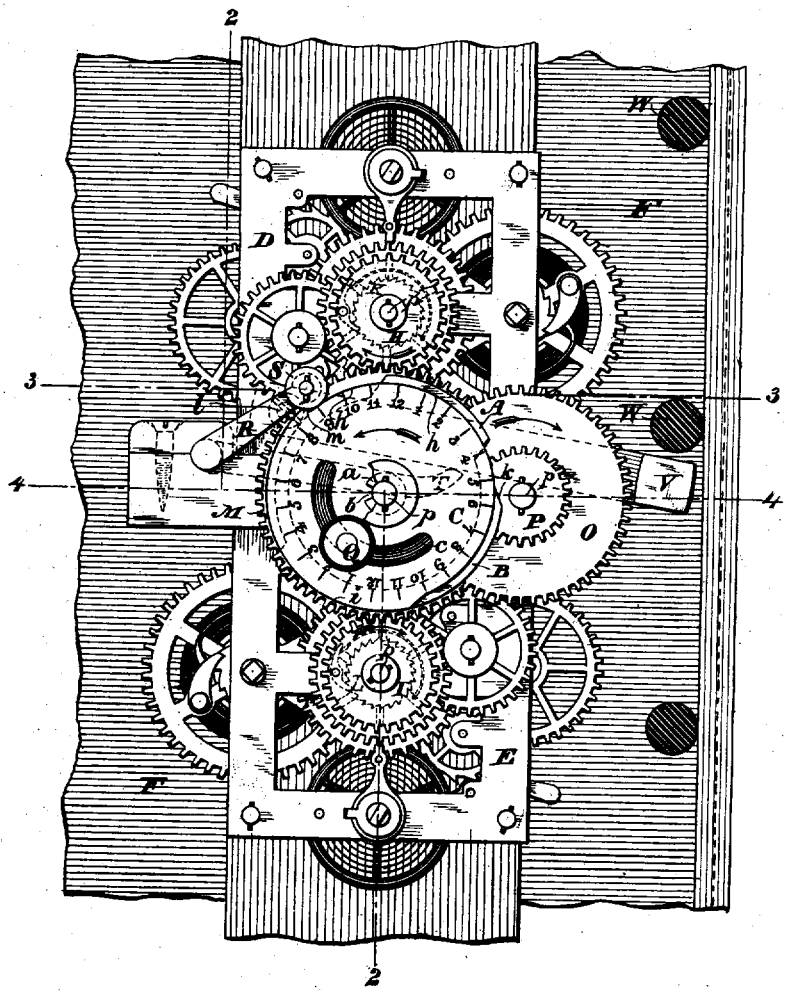

4 Sheets—Sheet 1.

S. A. LITTLE,

Assignor to THE YALE LOCK MANUFACTURING CO.

Time-Lock.

No. 8,550. Reissued Jan. 21, 1879.

WITNESSES

Wm A Skinkle

Geo W. Breck

INVENTOR

Samuel A. Little.

By his Attorneys

Baldwin, Hopkins & Peyton

THE NORRIS PETERS CO., PHOTO-LITHO., WASHINGTON, D. C.

S. A. LITTLE,

Assignor to THE YALE LOCK MANUFACTURING CO.

Time-Lock.

No. 8,550. Reissued Jan. 21, 1879.

WITNESSES

Wm A Skinkle

Geo H Buck

INVENTOR

Samuel A. Little.

By his Attorneys

Baldwin, Hopkins & Peyton.

THE MORRIS PETERS CO., PHOTO-LITHO., WASHINGTON, D. C.

S. A. LITTLE,

Assignor to THE YALE LOCK MANUFACTURING CO.

Time-Lock.

No. 8,550. Reissued Jan. 21, 1879.

WITNESSES

Wm A Skinkle

Geo W Breck

INVENTOR

Samuel, A. Little,

By his Attorneys

Baldwin, Hopkins, & Peyton.

THE NORRIS PETERS CO., PHOTO-LITHO., WASHINGTON, D. C.

S. A. LITTLE,

Assignor to THE YALE LOCK MANUFACTURING CO.

Time-Lock.

No. 8,550. Reissued Jan. 21, 1879.

*WITNESSES*

Wm. A. Skinkle.

Geo W Beck

*INVENTOR*

Samuel. A. Little.

By his Attorneys

Baldwin, Hopkins, & Peyton.

THE MORRIS PETERS CO., PHOTO-LITHO., WASHINGTON, D. C.

UNITED STATES PATENT OFFICE.

SAMUEL A. LITTLE, OF SHELBURNE, MASSACHUSETTS, ASSIGNOR TO THE YALE LOCK MANUFACTURING CO., OF STAMFORD, CONNECTICUT.

IMPROVEMENT IN TIME-LOCKS.

Specification forming part of Letters Patent No. 146,832, dated January 27, 1874; Reissue No. 7,104, dated May 9, 1876; Reissue No. 8,035, dated January 8, 1878; Reissue No. 8,550, dated January 21, 1879; application filed October 14, 1878.

*To all whom it may concern:*

Be it known that I, SAMUEL A. LITTLE, of Shelburne, in the county of Franklin and State of Massachusetts, have invented certain new and useful Improvements in Chronometric Locks; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of my invention is to construct a time-lock which shall dog and release the multiple bolt-work of a safe or vault at certain predetermined times, both the dogging and releasing being caused by the operation of the time mechanism. By this means the time when the lock will dog the bolt-work depends entirely on the adjustment of the internal mechanism of the lock, hereinafter described.

I provide adjustable devices, so that the periods when the lock shall be locked and unlocked may be varied at will; and I also provide a device whereby, at certain intervals—say on every seventh day—the lock will remain locked during the time when ordinarily it would be unlocked.

It will thus be seen that I have constructed a lock which will, of itself, dog and release bolt-work at a regular hour each day, except on certain predetermined days—Sundays, for example—when it will remain in the locked position all day. My lock, when once adjusted, is therefore absolutely automatic, requiring no attention except winding, and it is, so far as I am aware, the first time-lock which locks at a time determined by the time mechanism, while at the same time the hours for locking and unlocking can be changed without altering the construction of the lock.

To diminish the chances of accident from the stoppage of the time mechanism, I provide two independent movements, both of which assist in rotating the dial to actuate the lock; but should one stop the other will continue to rotate the dial.

The particular construction of my lock is, that the two time-movements rotate a graduated dial so arranged that its motion oscillates, at certain regular determinable intervals, a pivoted bent lever, which in turn, in one instance, for automatic locking, lifts the free part of, and thus oscillates on its stationary pivot, a metallic dog or obstruction, so as to cause it to rest in the way and prevent the retraction of the sliding bolt-work; and in the other instance, for automatic unlocking, it withdraws its support from under and permits the dog to oscillate by gravity, so as to clear the way for the retraction of the bolt-work.

The adjustability of my lock for locking and unlocking I obtain by means of my dial, which is so arranged that what I may call its "bolt or dog actuating points" can readily be changed from one position to another, so that they will actuate the dogging mechanism at any desired hours for locking or unlocking; and it is to be noted that in all continuously-running dials the adjustability for unlocking or locking preferably will be obtained in substantially the same way—*i. e.*, by varying the position of the dog-actuating points—because the dial itself should always be running on correct time.

I cause the lock to remain locked on Sundays or other desired days by means of a supplemental cam, which temporarily assumes one of the functions of my dial, and by which I can at any desired time cause the lock to remain locked during a greater period than twenty-four hours.

Figure 2:
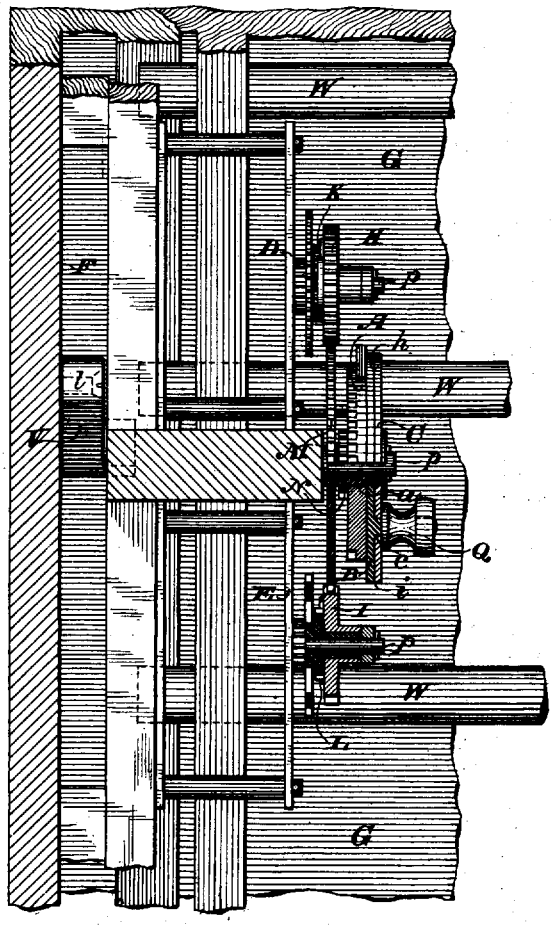
Figure 3:
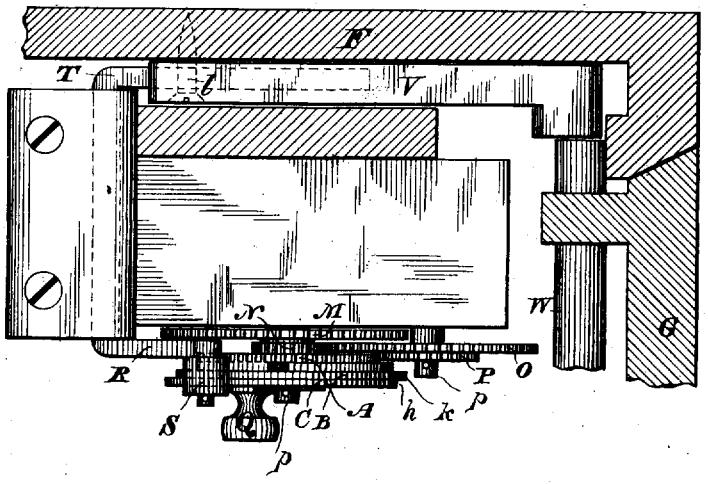
Figure 4:
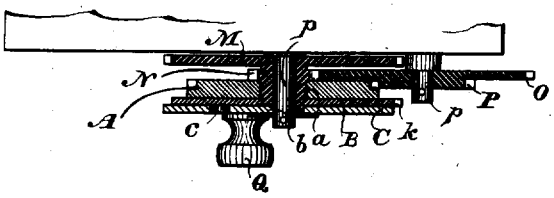
Figure 5:
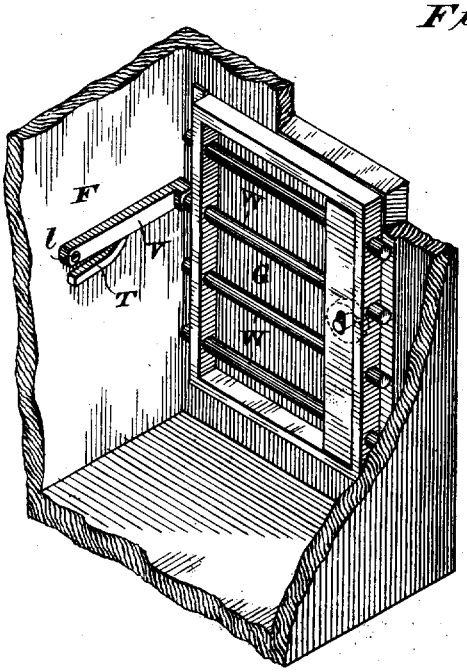
Figure 7:
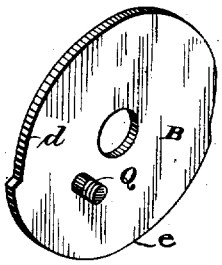
Figure 6:
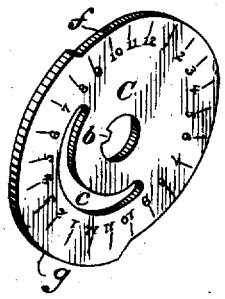

Referring now to the drawings in aid of a description of my lock in detail, Figure 1 is a front view of my improved time-lock attached to the inside of a safe, adjacent to the hinge part of the safe-door; Fig. 2, a view of the same, partly in elevation and partly in section, on the line 2 2 of Fig. 1; Fig. 3, a horizontal transverse section thereof on the line 3 3 of Fig. 1, with the upper time-movements removed, showing a plan of the locking mechanism proper; Fig. 4, a horizontal transverse section through the center of the locking-dials; Fig. 5, a perspective view of the interior of a safe, showing the door-bolts locked forward by the lever-dog; Fig. 6, a perspective view of the graduated dial, (marked C in Fig. 1;) Fig.

Figure 8:
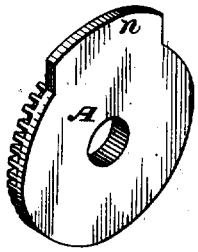

7, a similar view of wheel B in Fig. 1; Fig. 8, a similar view of a seventh-day wheel, (marked A in Fig. 1.)

D and E designate two time-movements fastened to the inside, F, of a safe, adjacent to the hinged part of the safe-door G. These time-movements, through the wheels and ratchets K and L, propel the wheels H and I in the direction of the arrows thereon. These wheels H and I rotate once in twelve hours, and are both geared to the common wheel M, which has twice as many teeth as either of them, and they propel it in the direction of the arrow thereon, so that while wheels H and I are rotated once in twelve hours, wheel M is rotated only once a day.

It will be seen that both time-movements work together in turning the wheel M, and thereby operate the lock; but if either accidentally stops, the wheel H or I of the other will alone continue to rotate the wheel M and operate the lock, because each ratchet will allow free motion to either wheel I or H in the absence of its normal impelling force.

The toothed wheel N, forming part of the wheel M, is geared into and drives the toothed wheel O. The toothed wheel P, forming part of the wheel O, is geared into and drives the seventh-day wheel A, which turns loosely on the hub *a* of the wheel M. This wheel A has twice as many teeth as wheel P, and wheel O has three and a half times as many teeth as wheel N. Therefore, while wheel M revolves once in a day, it only causes wheel A to revolve once in seven days. The wheel C, which is graduated for the hours of the day, is fastened rigidly upon the hub *a* by means of the projection *b* and rotates with it. Loose on the same hub is the wheel B, which may be fastened by friction to wheel C in different positions by the thumb-screw Q, that is attached to, or forms part of, the wheel B, and passes through the slot *c* of the wheel C.

*p p p p p* designate pivots, on which the several wheels revolve. The wheel B is cut away on its periphery, leaving the depression *d* and the cam projection *e*, and the periphery of wheel C is similarly cut away, leaving the depression *f* and the cam projection *g*, of the same form and size as the depression and projection of the wheel B. When these two wheels are fastened together by the thumb-screw Q side by side they form one wheel or dial having a depression, *h*, which may be enlarged or diminished by rotating the wheel B by means of the thumb-screw, and then setting it, and also having a cam or projection, *i*, which may be enlarged or diminished in the same manner. Pivoted near its middle to the lock-case is the bent lever R, one arm of which carries the friction-roller S, and is lifted by the cam *i*, revolving under the roller at the cam's inclined plane *k*, and at the same time the other arm, T, of said lever lifts the dog V, pivoted at *l*, up behind the door-bolts W W W W into the position shown in Fig. 5, thereby locking the bolts forward behind the jamb of the safe, so that the door cannot be opened. In due time, when the cam *i* is rotated entirely from under the roller S, the latter will drop into the depression *h* at the inclined plane *m*, which allows the dog V to fall from behind the safe-bolts, when they may be retracted and the safe opened.

It will be noted that the dog always tends to turn on its pivot automatically by gravity, so as to present a free space for the retraction of the bolt-work, and it is held up only for predetermined periods, to be measured by the time mechanism, by the bent lever.

The seventh-day wheel A has on its periphery a cam projection, *n*, which rotates once while the depression *h* rotates seven times, as described, and it is so arranged relatively to the depression *h* that on every seventh revolution thereof it is brought under the roller S and holds up the lever R, while the depression *h* passes under it, so that every seventh day this projection *n* prevents the safe from being unlocked.

From the foregoing description the mode of operation will be obvious.

The time-movements should be set to correct time by bringing the hour-mark on the dial C under the roller S, which is readily done by turning the dial, as the wheels A, B, C, and M turn freely in the direction of the arrow on wheel C, because the ratchets behind wheels H and I do not interfere with motion in that direction, but take up, and, through the force of the time-movements, proceed with, whatever advance of said wheels may be made. The lock should then be set to lock up at any given hour by loosening the thumb-screw Q, and turning the inclined plane *k* of the wheel B to the mark of the required hour, and then fastening the wheels B and C together by setting the thumb-screw Q. The dial will then indicate the time of locking and unlocking, and the operation of the time-movements will cause the oscillation of the dog into position to obstruct the retraction of the bolt-work in a little time, or at whatever time may have been decided upon, and it will be held there until the time arrives for unlocking, when the continued operation of the time-movements will withdraw its support, and it will fall out of the way.

If it is desired to have the safe opened any given amount of time earlier than the set time—say, 9 o'clock—the wheel C must be turned, as described, until the time indicated under the roller shall be that amount fast of the correct time, the closing-mark being altered, if desired, to suit the case. If it is desired to open later, the clocks must be stopped until they are slow of time as much as it is desired the lock shall open later than the set time, correcting the closing-mark, if desired.

If the wheels A, B, C, and M are turned, as described, until the cam part *n* of the wheel A shall be in position to come under the roller S and keep the lock from opening on Sunday, it will continue to do so on Sunday each week if the time-movements run on unchanged. Thus the necessity for setting the mechanism on every Saturday so that it shall keep the safe locked over Sunday is obviated, which is a great convenience to bankers, and is, furthermore, a security against neglect to set the mechanism weekly, which might sometimes occur. In case it shall be desired that the lock shall not open for a holiday or other day, the said wheels may be rotated until the cam projection *n* is in position to come under the roller S and hold up the lever R on such day.

The lock is affixed to the side F of the safe, as described, to avoid derangement or stoppage of the time-movements by concussion on the door; but it is obvious that it may be affixed to the door without modifying its construction, if desired, that being merely a change of location.

It is evident that the dog V and the lever R may be one and the same piece. The object of making them in two parts is to save the weight of the part V, which depends upon the pivot *l* from adding to the labor of the time-movements, and also to make the dog or obstruction entirely distinct from the time mechanism.

I am aware of the patent granted to Williams and Cummings, No. 17,245, and dated May 5, 1857, and do not claim anything shown therein, but intend to limit my claims to comprehend only the improvements I have made over the peculiar combinations shown in that patent, whereby I reduce the number, modify the construction, change the relative position and mode of operation of the parts, and simplify my mechanical organization, as will fully appear by comparison.

What I claim as my invention is—

1. The combination of independent multiple bolt-work with the time mechanism and locking or dogging mechanism of a time-lock, automatically both dogging and releasing the bolt-work at predetermined times, substantially as described.

2. The combination, in a time-lock, of a continuously-revolving adjustable device for determining the time of operation of the unlocking mechanism, a pivoted arm or lever actuated by said device, and a dog or obstruction movable directly by said pivotal arm at regularly-recurring periods, to permit the retraction of the bolt-work, substantially as described.

3. In a time-lock, the combination of time mechanism, a revolving dial actuated thereby, a dog and suitable connecting mechanism, whereby the continuous revolution of the dial causes the dog to move into the locked and unlocked positions alternately, substantially as described.

4. In a time-lock, the combination of a continuously-rotating dial and mechanism which causes the lock to lock and unlock automatically, substantially as described.

5. In a time-lock, a continuously-rotating dial provided with an adjustable device for automatically determining the time of locking, substantially as described.

6. In a time-lock, the combination, substantially as above set forth, of the time-movements and an adjustable device for automatically determining the time of locking.

7. In a time-lock, the combination, substantially as above set forth, of the time-movements and two adjustable devices, one for determining the time of locking, and the other of unlocking.

8. In a time-lock, the combination, with the time mechanism and the locking or dogging mechanism, of an adjustable device which, through the continuous operation of the time mechanism, will periodically, or at required times, cause the lock to remain locked during a greater period than twenty-four hours, substantially as described.

9. In a continuously-running automatic time-lock, the combination, with the time mechanism and the locking or dogging mechanism, of an independent device adapted to be set to prevent, at any desired time, the unlocking of the lock for a greater period than twenty-four hours, substantially as described.

10. The combination, substantially as above set forth, of the adjustable mechanism for continuously locking and unlocking daily the time-movements, and a device for preventing unlocking during a greater period than twenty-four hours.

11. In a time-lock provided with two independent time-movements and an interlocking device common to both, the combination, with each of said movements, of a ratchet and pawl interposed between the last or driving arbor of each movement and the said common unlocking device, whereby the said device may be driven by either or both of the movements, and the stoppage of one movement will not necessarily cause the stoppage of the other, substantially as described.

12. The combination, with the time-movements, of the wheels H I, the ratchets K L, and the common wheel M, arranged substantially as described, for the purpose set forth.

13. In combination with the dial, the seventh-day cam-wheel A, adjustable as described, to prevent the falling of the bent lever R and dog V, either periodically or at required times, as described.

14. The combination, in a time-lock, of time mechanism, a revolving graduated dial actuated thereby, a bent lever oscillated by the revolution of the dial on an immovable pivot, and a dog or obstruction, also oscillated on an immovable pivot, the lever and dog being so arranged that when one arm of the lever is pushed aside at a predetermined time by the revolution of the dial, the other arm withdraws its support from under and permits the dog to turn by gravity, thereby leaving a free space for the retraction of the bolt-work, substantially as described.

15. The combination of multiple sliding bolt-work, a dog or obstruction oscillated on an immovable pivot, and tending, by gravity, to turn so as not to dog the bolt-work, a bent lever, oscillated also on an immovable pivot, for holding the dog in position against gravity, to dog the bolt-work, a revolving graduated dial, which, by its revolution at a predetermined time, oscillates the bent lever, and time mechanism that actuates the dial, substantially as described.

16. The combination, substantially as before set forth, by means of suitable connecting mechanism, of the following elements, adapted, as combined, to secure the door of a safe or vault, and to automatically release the same at a predetermined time, viz: first, the multiple sliding bolt-work; second, the oscillating stop or dog, adapted to prevent the retraction of the bolt-work, and to be turned on its pivot to release the bolt-work at a time determined by the clock-work; third, the vibrating lever for holding the stop or dog in position to prevent the retraction of the bolt-work; and, fourth, the clock-work for determining the time when said lever shall be moved to permit the stop or dog to release the bolt-work.

17. In a chronometric locking mechanism, the combination, substantially as before set forth, of the following elements, adapted, as combined, to guard or dog the bolt-work of a safe or vault door, and to automatically release the same at a predetermined time, viz: first, the oscillating stop or dog, adapted to prevent the retraction of the bolt-work, and to be turned on its pivot to release the bolt-work at a time determined by the clock-work; second, the vibrating lever for holding the dog in position to prevent the retraction of the bolt-work; third, the clock-work for determining the time when said lever shall be moved to permit the dog to fall to release the bolt-work; and, fourth, the graduated wheel or dial, rotated by the clock-work, and adapted to operate said lever, and to be set for varying and controlling the time when said lever shall be moved to permit the dog to release the bolt-work.

In testimony that I claim the foregoing I have hereunto set my hand this 4th day of June, 1878.

SAMUEL A. LITTLE.

Witnesses:
A. K. HAWKS,
J. B. BARDWELL.